(12) United States Patent
O'Donnell

(10) Patent No.: US 8,358,382 B2
(45) Date of Patent: Jan. 22, 2013

(54) SYSTEM AND METHOD FOR AUTOMATIC CABLE-ONLY TUNING

(75) Inventor: Eugene Murphy O'Donnell, Fishers, IN (US)

(73) Assignee: TTE Technology, Inc., Indianapolis, IN (US)

( * ) Notice: Subject to any disclaimer, the term of this patent is extended or adjusted under 35 U.S.C. 154(b) by 1258 days.

(21) Appl. No.: 12/093,312

(22) PCT Filed: Nov. 14, 2005

(86) PCT No.: PCT/US2005/041564
§ 371 (c)(1),
(2), (4) Date: May 9, 2008

(87) PCT Pub. No.: WO2007/055702
PCT Pub. Date: May 18, 2007

(65) Prior Publication Data
US 2008/0284918 A1 Nov. 20, 2008

(51) Int. Cl.
*H04N 5/50* (2006.01)
*H04N 5/46* (2006.01)

(52) U.S. Cl. .......................... 348/732; 348/558; 348/569

(58) Field of Classification Search .................. 348/731, 348/732, 554–570, 706, 705; 725/38, 56
See application file for complete search history.

(56) References Cited

U.S. PATENT DOCUMENTS

| | | | | |
|---|---|---|---|---|
| 4,776,038 A | * | 10/1988 | Testin et al. | 455/182.3 |
| 6,020,882 A | * | 2/2000 | Kinghorn et al. | 715/716 |
| 2005/0086693 A1 | * | 4/2005 | Shintani | 725/54 |

OTHER PUBLICATIONS

PCT International Search Report and Written Opinion of the International Searching Authority, mailed Jul. 24, 2006, 11 pp.

* cited by examiner

*Primary Examiner* — Michael Lee
(74) *Attorney, Agent, or Firm* — Fletcher Yoder

(57) ABSTRACT

The disclosed embodiments relate to a system and method that initializes a display device. An exemplary embodiment comprises scanning an input signal to determine the presence of a cable television signal, proceeding to normal operation of the display device if the cable television signal is present in the input signal, scanning the input signal for an over-the-air television signal if the cable television signal is not present in the input signal, and providing a message indicating potential inappropriate reception of over-the-air signals if the over-the-air television signal is present in the input signal.

20 Claims, 2 Drawing Sheets

SYSTEM AND METHOD FOR AUTOMATIC CABLE-ONLY TUNING

FIELD OF THE INVENTION

The present invention relates generally to television systems. More specifically, the present invention relates to a television system that automatically tunes to cable television signals.

BACKGROUND OF THE INVENTION

This section is intended to introduce the reader to various aspects of art, which may be related to various aspects of the present invention that are described and/or claimed below. This discussion is believed to be helpful in providing the reader with background information to facilitate a better understanding of the various aspects of the present invention. Accordingly, it should be understood that these statements are to be read in this light, and not as admissions of prior art.

Television (TV) sets currently have the ability to receive cable TV (CATV) frequency channels as well as analogue over-the-air (OTA) frequency channels, wherein the two may overlap in certain regions of the electromagnetic spectrum. Further, OTA frequency channels carrying TV signals are government-controlled by a National Television Standard Committee (NTSC) established by the Federal Communication Commission (FCC). The NTSC Standards include requirements for image resolution, image rate, frequency modulation, and the like. Accordingly, the NTSC standards pertain to hardware components of a TV system and the manner in which the TV system operates.

With the advent of digital technology, a need for new and revised standards has led to the foundation of an Advanced Television Standard Committee (ATSC). The ATSC sets standards pertaining to format, compression, and transmission of digital television in the U.S. Pursuant to FCC regulations, it is anticipated that by 2009 NTSC standards will cease to be in effect and will be replaced by the ATSC standards. FCC regulations currently require every television set larger than a certain size manufactured with an NTSC tuner to include an ATSC tuner and decoder as well. The maximum size for TVs to be exempt from this requirement is scheduled to shrink each year until all TVs and other devices, such as DVD Recorders are included.

In contrast, cable television, which is the dominant medium by which most consumers receive their TV programs, are not regulated by the FCC. Despite this, most manufacturers continue to offer TV systems with OTA tuners. Hence, foreseeing the impending FCC regulations along with reducing cost, manufacturers may choose to produce television sets having only one tuner, namely an analog cable tuner. In the interim, customers purchasing TV systems having, for example CATV and NTSC capabilities, may unintendedly tune some OTA channel frequencies which may legally require a television that includes an NTSC tuner. The unintended reception may be due to the overlap between CATV and OTA signals. Hence, unintended reception of some OTA signals may lead to customer confusion as to why they are not receiving the full complement of OTA signals. Further, consumers who, for example, don't have the NTSC tuner in their TV system, but are capable of receiving overlapping NTSC regulated OTA signals my be placed in noncompliance with FCC regulations.

SUMMARY OF THE INVENTION

Certain aspects commensurate in scope with the disclosed embodiments of the invention are set forth below. It should be understood that these aspects are presented merely to provide the reader with a brief summary of certain forms the invention might take and that these aspects are not intended to limit the scope of the invention. Indeed, the invention may encompass a variety of aspects that may not be set forth below.

Accordingly, it is desirable to have a system and method which detects OTA signals and notifies a TV user when the OTA signals are detected. A notification message to the user may include information indicating types of signals detected and required action the user must undertake in order to, for example, comply with FCC regulations. Thus, unnecessary confusion is avoided and adherence to FCC regulations is maintained.

BRIEF DESCRIPTION OF THE DRAWINGS

Advantages of the invention may become apparent upon reading the following detailed description and upon reference to the drawings in which.

DETAILED DESCRIPTION

One or more specific embodiments of the present invention will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Figure 1:
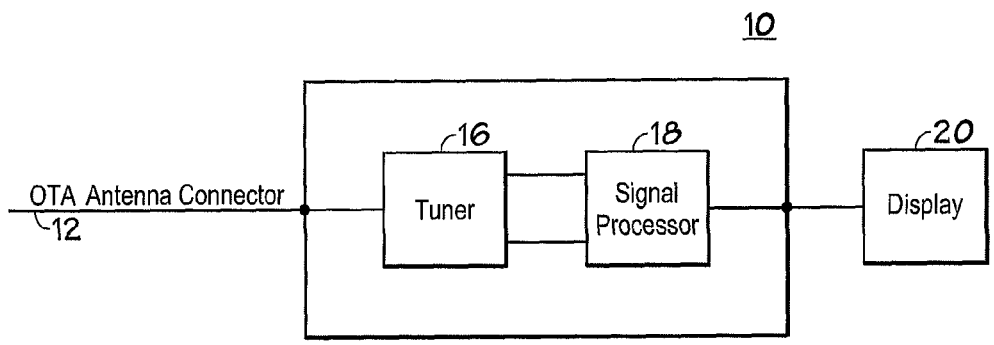
FIG. 1 is a block diagram showing components of a TV system in accordance with embodiments of the present invention.

Turning now to FIG. 1, a block diagram of a TV system 10 in accordance with one embodiment of the present technique is shown. The TV system 10 includes a Cable Compatible tuner 16 and a signal processor 18. The television system 10 also includes an antenna connector 12. The antenna connector 12 configures the system 10 to receive respective CATV signals. Further, the TV system 10 is coupled to a display 20 configured to display decodable Cable TV signals to a user.

Accordingly, TV signals received by the cable tuner 16 via the antenna connectors 12 are transferred to the signal processor 18. The signal processor 18 may include components configured to, for example, scan, digitize/dedigitize and amplify the signals received by the tuner 16. Such components may include Analogue to Digital (A/D) converters, amplifiers, memory devices and the like. Further, signals outputted by the signal processor 18 are transferred to the display 20 for user viewing.

Figure 2:
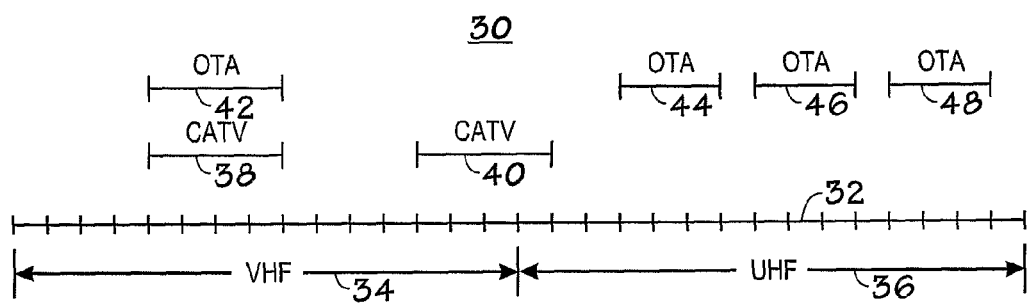
FIG. 2 is a diagram depicting OTA and NTSC frequency allocation regions in accordance with an exemplary embodiment of the present invention.

Referring now to FIG. 2, a frequency allocation graph 30 for a Very High Frequency (VHF) domain 34 and for an Ultra High Frequency (UHF) domain 36 are shown on frequency axis 32. Accordingly, regions 38, 40 depict exemplary frequency allocation for CATV signals, and regions 42-48 depict exemplary frequency allocation regions for OTA signals. Thus, as depicted by FIG. 2, CATV and OTA may have an overlapping region, especially in the VHF region (or what are known as channels 2-13). An example of this overlap is illustrated by the OTA region 42 and the CATV region 38, which encompass the same portion of the VHF spectrum.

Due to this overlap, TV system 10 may receive OTA signals which may legally require the use of an NTSC tuner. Such signals may be picked up by the CATV antenna connector and tuned to by the tuner 16. As discussed above, such OTA tuning would be unintended and may conflict with FCC regulations, causing unnecessary user confusion. To mitigate such inconveniences, the signal processor 18 may be configured to execute a software routine detecting unintended OTA reception. Further, the routine may configure the TV system 10 to output a message for the user on the display 20, indicating unintended reception, and may include instructions, for example, that additional hardware may be needed for compliant reception of OTA signals.

Figure 3:
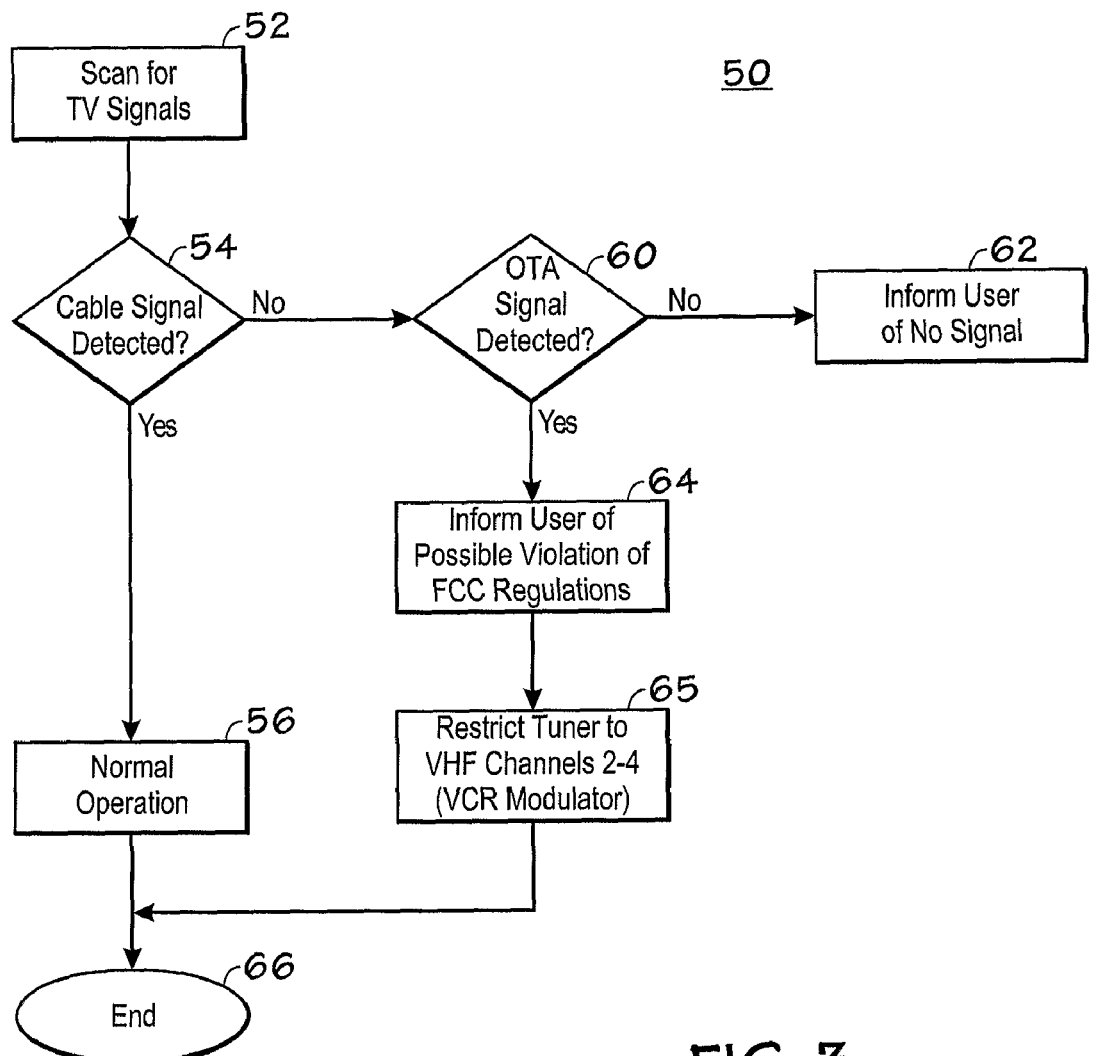
FIG. 3 is a flow chart depicting steps implemented by a software routine in accordance with an exemplary embodiment of the present invention.

FIG. 3 is a flow chart depicting steps implemented by a software routine in accordance with the present technique. The flow chart is generally referred to by the reference numeral 50. In general the, flow chart 50 outlines steps performed by the signal processor 18 in executing a software routine configured to differentiate between OTA and CATV reception by TV system 10. Further, upon unintended reception of OTA signals the routine depicted by the flow chart 50 is configured to display an output via display 20, notifying the user on the unintended reception.

Accordingly, execution of the routine begins at step 52, whereby the signal processor of the TV system 10 scans for TV signals, for example, in frequency regions 34-36 depicted in FIG. 2. At decision block 54, detection of CATV signals configures the TV system 10 to operate in a normal mode, as shown at block 56. During normal operation, the signal processor 18 transmits an observable television signal to the display 20 for the user to view CATV programs of his/her choice.

If no CATV signals are detected, as may be determined at decision block 54, the TV system 10 may scan other frequency regions, such as UHF regions 44-48 of FIG. 2, which only carry OTA signals. If OTA signals are not detected by the TV system 10, the routine terminates at block 62, and the user is informed via display 20 that no signal is detected at all.

Alternatively, a positive output at block 60 of the routine may indicate OTA reception by the TV system 10, for example, from any one of the regions 42-48 of FIG. 2. However, reception of OTA signals in regions that can only carry OTA signals, such as regions 44-48, would affirmatively indicate that the TV system 10 is connected to an OTA source. Consequently, block 64 of the routine configures the TV system 10 to output a message for the user via display 20 that OTA reception has occurred. Further, absent an NTSC tuner, the TV system 10 may be configured to inform the user of FCC non-compliance and any required action needed by the user to rectify the situation.

In addition, upon determining that the TV system 10 is connected to the OTA source, the tuner 16 may be restricted to tuning only certain frequencies conforming to certain channels, such as channels 2-4, for use with Video Cassette Recorder (VCR) modulators. Such a restriction is shown by way of example at block 65 of the flowchart 50. Thereafter, the routine may terminate at block 66.

While the invention may be susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents and alternatives falling within the spirit and scope of the invention as defined by the following appended claims.

What is claimed is:

1. A method of initializing a display device, comprising:
scanning an input signal to determine the presence of a cable television signal;
proceeding to normal operation of the display device if the cable television signal is present in the input signal;
scanning the input signal for an over-the-air television signal if the cable television signal is not present in the input signal; and
providing a message indicating potential inappropriate reception of over-the-air signals if the over-the-air television signal is present in the input signal.

2. The method, as set forth by claim 1, wherein the over-the-air television signal is in an overlapping region of a spectrum that is common between the over-the-air television signal and the cable television signal.

3. The method, as set forth by claim 2, wherein the overlapping region of the spectrum is in the very high frequency (VHF) domain.

4. The method, as set forth by claim 1, wherein the television signal is in a non-overlapping region of a spectrum between the over-the-air television signal and the cable television signal.

5. The method, as set forth by claim 4, wherein the non-overlapping region of the spectrum is in the ultra high frequency (UHF) domain.

6. The method, as set forth by claim 1, comprising informing the user that neither the cable television signal nor the over-the-air television signal is present if the over-the-air television signal is not present in the input signal.

7. The method, as set forth by claim 1, comprising restricting reception of the input signal to a predetermined frequency range if the over-the-air television signal is present in the input signal.

8. The method, as set forth by claim 7, wherein the predetermined frequency range is compatible with operation of a video cassette recorder (VCR).

9. A display device, comprising:
a display screen that is adapted to display an image;
a tuner that is adapted to receive an input signal; and
a signal processor that is adapted to:
scan the input signal to determine the presence of a cable television signal;
proceed to control normal operation of the display device if the cable television signal is present in the input signal;
scan the input signal for an over-the-air television signal if the cable television signal is not present in the input signal; and
display a message on the display screen indicating potential inappropriate reception of over-the-air signals if the over-the-air television signal is present in the input signal.

10. The display device, as set forth by claim 9, wherein the tuner is configured to receive over-the-air television signals.

11. The display device, as set forth by claim 9, wherein the tuner is configured to receive cable television signals.

12. The display device, as set forth by claim 9, wherein the tuner is configured to receive digital television signals.

13. The display device, as set forth by claim 9, wherein the tuner is configured to scan an overlapping region of a spectrum that is common between the over-the-air television signal and the cable television signal.

14. The display device, as set forth by claim 9, wherein the tuner is configured to scan a non-overlapping region of a spectrum between the over-the-air television signal and the cable television signal.

15. The display device, as set forth by claim 9, wherein the tuner is configured to scan in the very high frequency (VHF) domain.

16. The display device, as set forth by claim 9, wherein the tuner is configured to scan in the ultra high frequency (UHF) domain.

17. A system that is adapted to initialize a display device, comprising:

means for scanning an input signal to determine the presence of a cable television signal;

means for proceeding to normal operation of the display device if the cable television signal is present in the input signal;

means for scanning the input signal for an over-the-air television signal if the cable television signal is not present in the input signal; and means for providing a message indicating potential inappropriate reception of over-the-air signals if the over-the-air television signal is present in the input signal.

18. The system, as set forth by claim 17, wherein the over-the-air television signal is in an overlapping region of a spectrum that is common between the over-the-air television signal and the cable television signal.

19. The system, as set forth by claim 17, comprising means for informing the user that neither the cable television signal nor the over-the-air television signal is present if the over-the-air television signal is not present in the input signal.

20. The system, as set forth by claim 17, comprising means for restricting reception of the input signal to a predetermined frequency range if the over-the-air television signal is present in the input signal.

* * * * *